United States Patent [19]

Nakagawa et al.

[11] Patent Number: 4,764,883
[45] Date of Patent: Aug. 16, 1988

[54] INDUSTRIAL ROBOT HAVING SELECTIVE TEACHING MODES

[75] Inventors: Tohru Nakagawa; Hitoshi Kubota; Masuo Matsumoto, all of Osaka, Japan

[73] Assignee: Matsushita Electric Industrial Co., Ltd., Osaka, Japan

[21] Appl. No.: 868,656

[22] Filed: May 29, 1986

[30] Foreign Application Priority Data

May 30, 1985 [JP] Japan .................................. 60-116914
May 30, 1985 [JP] Japan .................................. 60-116925

[51] Int. Cl.$^4$ ............................................. G06F 15/46
[52] U.S. Cl. ...................................... 364/513; 901/3; 364/191
[58] Field of Search .................... 364/513, 191–193; 901/3, 4, 5

[56] References Cited

U.S. PATENT DOCUMENTS

| Re. 30,132 | 10/1979 | Irie ........................................ | 364/513 |
| 3,943,343 | 3/1976 | Irie ........................................ | 364/513 |
| 4,263,538 | 4/1981 | Richiardi ................................ | 901/4 |
| 4,347,578 | 8/1982 | Inaba ..................................... | 901/5 |
| 4,511,985 | 4/1985 | Inaba et al. .......................... | 364/513 |
| 4,604,716 | 8/1986 | Kato et al. ........................... | 364/513 |
| 4,617,502 | 10/1986 | Sakaue et al. ....................... | 364/513 |

Primary Examiner—Jerry Smith
Assistant Examiner—Allen MacDonald
Attorney, Agent, or Firm—Lowe, Price, LeBlanc, Becker & Shur

[57] ABSTRACT

For operating an industrial robot, first, second and third flags are selectively generated as an indication of first, second and third teaching modes, respectively. A position signal representative of the path to be traced by the robot arm is sampled at a higher rate in response to the first flag to produce a first train of samples or at a lower sampling rate in response to the second and third flags to produce a second train of samples. A sample between successive samples of the second train is interpolated when the second flag is generated and combined with the samples of the second train. When the third flag is generated, a sample between successive samples of the second train is approximated. The robot arm is controlled in accordance with the first train of samples in the presence of the first flag or in accordance with the combined samples or approximated samples in the presence of the second and third flags. The first teaching mode is selected when the path to be traced contains many bends and curves and the second and third teaching modes are selected for causing the robot arm to trace a relatively smooth path without being adversely affected by operator's hand vibrations.

9 Claims, 6 Drawing Sheets

INDUSTRIAL ROBOT HAVING SELECTIVE TEACHING MODES

BACKGROUND OF THE INVENTION

The present invention relates to an industrial robot, and more particularly to a method and system for operating the robot according to a selected teaching mode.

It has been known to teach an industrial robot so that in playback its arm traces a desired path. However, it has been recognized that an operator's hand tends to vibrate as his teaches the robot and adversely affects on the movement of the robot arm. Furthermore, the path to be traced by the robot arm contains bends and curves which vary in different ways depending on different tasks it is assigned to perform. It is thus advantageous to teach the robot arm to trace a path in a selective mode according to the assigned task.

SUMMARY OF THE INVENTION

It is therefore an object of the present invention to provide a method and system for operating an industrial robot in a selective teaching mode to meet different tasks the robot is assigned to perform.

According to the present invention, first, second and third flags are selectively generated for indicating first, second and third teaching modes, respectively. A position signal representative of the path to be traced by an industrial robot arm is generated and sampled at a higher rate in response to the first flag to produce a first train of samples or at a lower sampling rate in response to the second and third flags to produce a second train of samples. When the second flag is generated a sample between successive samples of the second train is interpolated and combined with the samples of the second train to produce a third train of samples. When the third flag is generated, a sample between successive samples of the second train is approximated to produce a fourth train of samples. A motor is controlled in accordance with the first, third and fourth trains of samples to cause the robot arm to trace a desired path. The first teaching mode is selected when the path to be traced contains many bends and curves. The second and third teaching modes are advantageously selected for causing the robot arm to trace a relatively smooth path without being adversely affected by operator's hand vibrations.

BRIEF DESCRIPTION OF THE DRAWINGS

The present invention will be described in further detail with reference to the accompanying drawings, in which.

DETAILED DESCRIPTION

Figure 1:
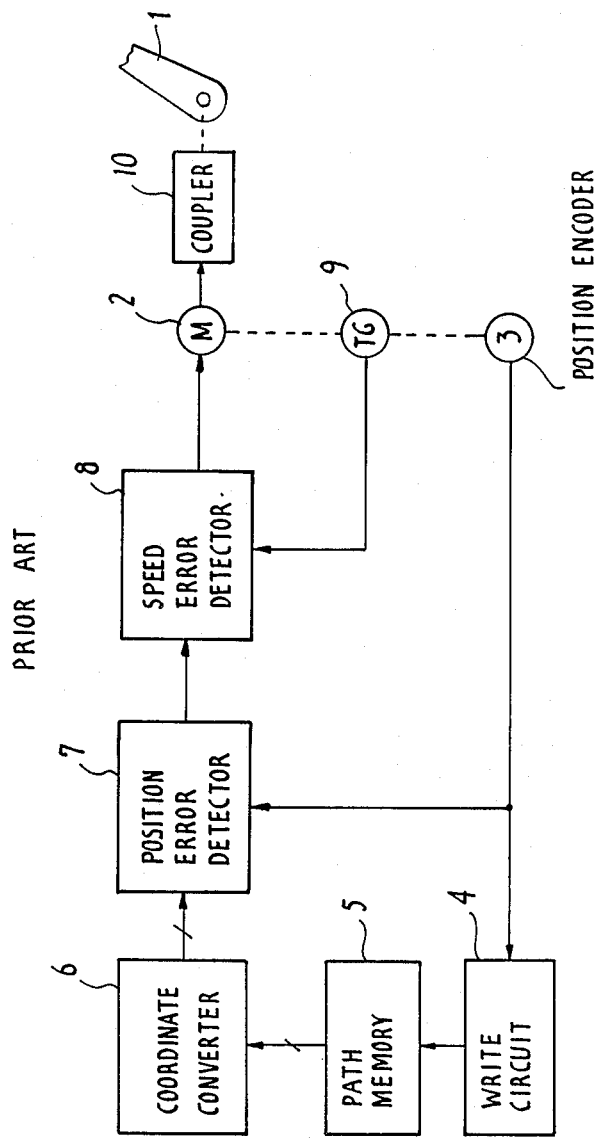
FIG. 1 is a block diagram of a prior art robot teaching system.

Prior to description of the present invention, it is appropriate to refer to FIG. 1 in which is shown a prior art system for teaching an industrial robot. When teaching the robot, the robot arm 1 is directly manipulated by an operator so that it traces a desired path. As the arm traces the path, a motor 2, which drives the arm through a coupler 10, rotates with the arm and the angular position of the motor shaft is detected by a position encoder 3. The output of encoder 3 is written by a write circuit 4 into a path memory 5 at periodic intervals. In playback, a coordinate converter 6 addresses the memory to sequentially read the stored angular position signal and converts the position signal to a coordinate signal representing the position of the arm 1 in a three-dimensional coordinate system. The coordinate position signal is applied to a position error detector 7 where it is compared with an angular position signal supplied from the position encoder 3. The detected position error is trimmed with a position correction factor and fed to a speed error detector 8 as a speed reference signal for comparison with an actual speed signal supplied from a tachogenerator 9 coupled to the motor shaft. The detected speed error is trimmed with a speed correction factor and amplified to a level sufficient to drive the motor.

However, small vibrations can occur in the operator's hand as it moves the robot arm and are transmitted to the arm and thence to the position encoder 3. Thus, the stored path data contains undesired vibratory components affected by the vibrations. It is thus impossible to achieve high precision when positioning the arm.

Figure 2:
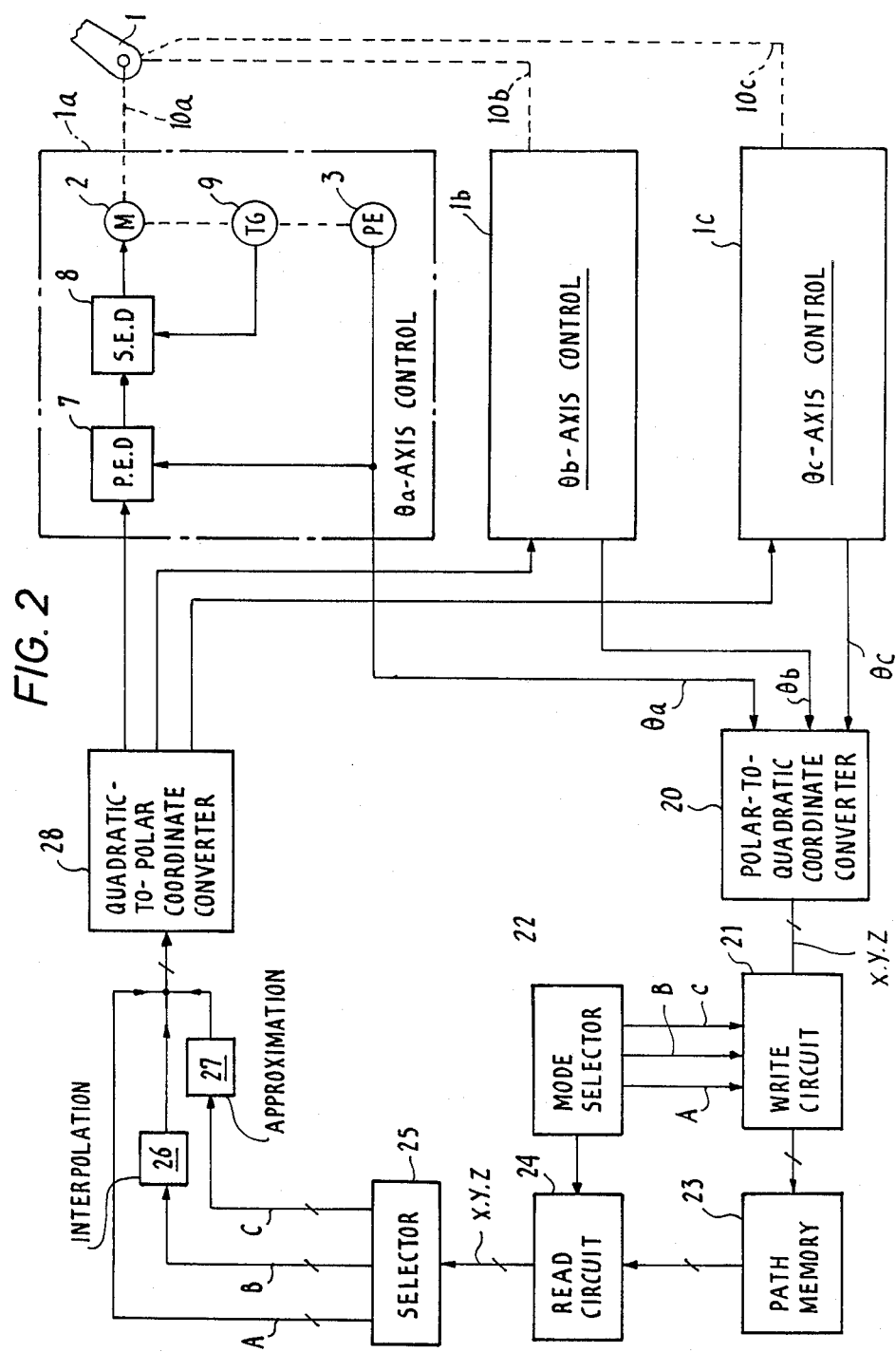
FIG. 2 is a block diagram of a robot teaching system according to an embodiment of the present invention.

Referring to FIG. 2, there is shown an industrial robot system according to an embodiment of the present invention in which parts corresponding to those in FIG. 1 are marked with the same numerals as used in FIG. 1. In FIG. 2, the robot arm 1 is controlled by a set of speed control units 1a, 1b and 1c of identical circuit configuration connected by respective couplers 10a, 10b and 10c. Each speed control unit comprises motor 2, tachogenerator 9, position encoder 3, position error detector 7 and speed error detector 8.

The angular position signals $\theta a$, $\theta b$ and $\theta c$ from speed control units 1a, 1b and 1c are applied to a polar-to-quadratic coordinate converter 20 where the angular position signals are converted to a set of X, Y and Z coordinate signals respectively represented by the coordinates of a three-dimensional quadratic coordinate system. The quadratic coordinate signals X, Y and Z are applied to a write circuit 21 which samples each coordinate signal at a variable rate determined by a mode select flag supplied from a mode selector 22. Mode selector 22 is manually operated to generate a flag A which indicates that the path the robot arm is to follow has a greater number of bends and curves, a flag B indicating that the path has a medium number of bends and curves, and a flag C indicating that the path has a smallest number of bends and curves.

During a teaching mode, the operator selects one of the flags according to the characteristic of the intended path with due consideration on the effect of possible vibrations of his hands on the arm movement, while manipulating the arm to follow an intended path. When flag A is entered, the write circuit 21 is directed to sample each coordinate position signal at a high rate. For flags B and C, the write circuit 22 is directed to sample the coordinate signals at a low rate. Write circuit 22 also generates a time-keeping signal indicating the sampling time for each sample point and forms a data set by the mode-select flag, time-keeping signal and its associated sample point signal. Each data set is stored into an addressable memory cell of a path memory 23.

In playback, the path memory 23 is addressed by a read circuit 24 to sequentially read the stored data sets into a selector 25. Selector 25 decodes the flag of each data set and selects one of its output lines A, B and C corresponding respectively to the selected flags A, B and C. If flag A has been selected during the teaching mode, selector 25 couples the output of read circuit 24 directly to a quadratic-to-polar coordinate converter 28 where it is converted to a set of angular position signals. If flag B has been selected, the output of read circuit 24 is applied to an interpolation circuit 26 which performs interpolation of quadratic positions for each coordinate signal over a plurality of sample points defined by their associated time-keeping signals and supplies a set of interpolated signals X, Y and Z indicating an intermediate angular position between successively sampled angular positions to quadratic-to-polar coordinate converter 28. If flag C has been selected, the output of read circuit 24 is applied to an approximation circuit 27 which performs approximation of quadratic positions for each coordinate signal over plural sample points defined by the associated time-keeping signals so that the approximated quadratic positions describe a smooth path in the three-dimensional coordinate system which may somewhat deviate from the path traced by the arm 1 during the teaching mode. The approximated positions are represented by corresponding signals and applied to coordinate converter 28.

Quadratic-to-polar coordinate converter 28 converts the X, Y and Z coordinate signals of either flag into a set of angular position signals for coupling to the position error detectors 7 of the control units 1a, 1b and 1c, respectively.

Figure 3:
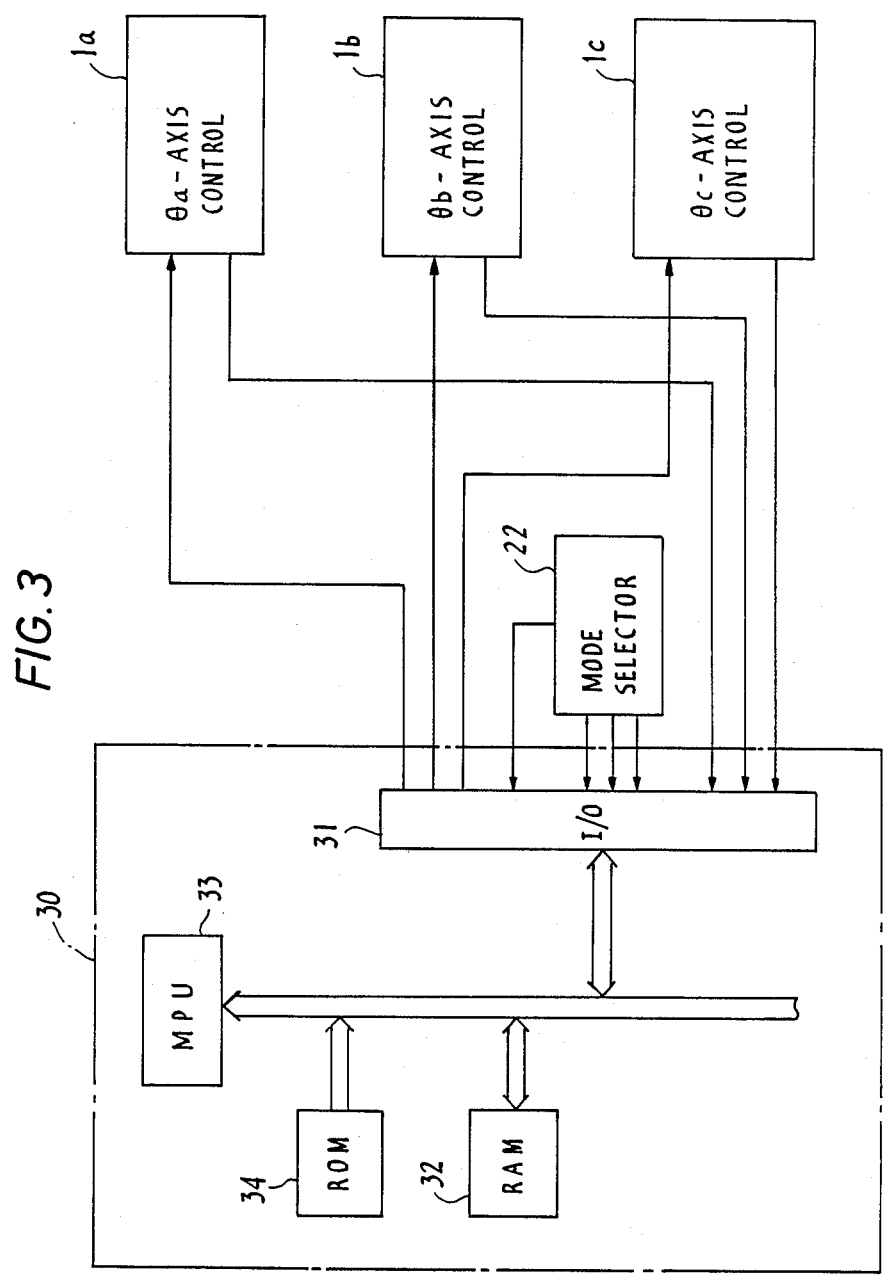
FIG. 3 is a block diagram of a robot teaching system of the present invention which is implemented by a microcomputer.
Figure 4:
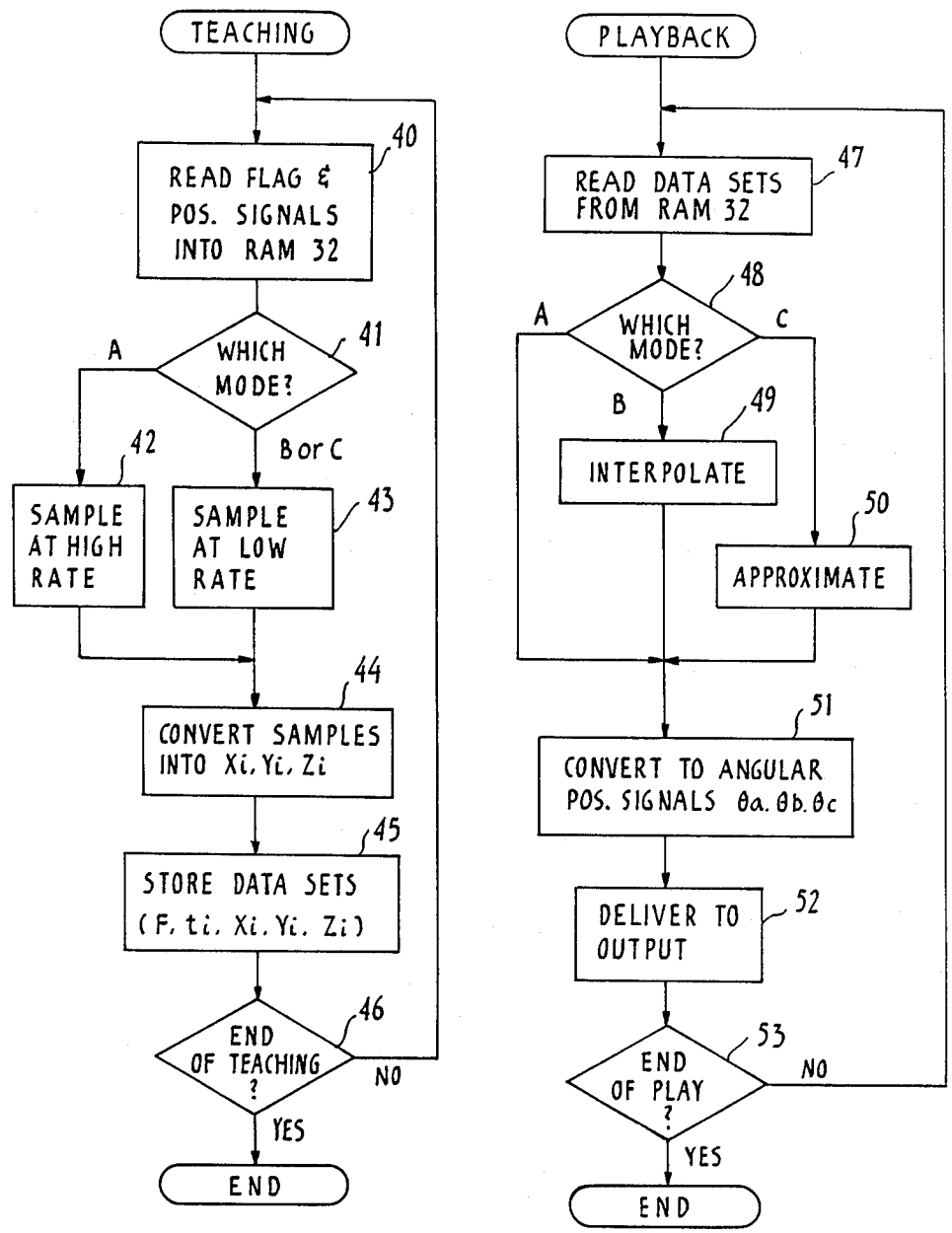
FIG. 4 is a flowchart describing the instructions performed by the microprocessor of FIG. 3 according to one embodiment of the invention.

The embodiment of FIG. 2 can also be implemented by a microcomputer 30, as shown in FIG. 3. The input angular position signals from X-, Y- and Z-axis control units 1a, 1b and 1c are applied to an input/output port 31 and the output angular position signals are supplied from the input/output port 31 to the respective control units. Mode selector 22 is also connected to the input-/output port 31. A random access memory 32 operates as a path memory for storage of the data sets mentioned in the previous embodiment. A microprocessor 33 operates in accordance with a program stored in a read-only memory 34. FIG. 4 is an illustration of the program stored in the read-only memory 34. A teaching mode starts with operations block 40 which directs the microprocessor 33 to read a mode flag from mode selector 22 and angular position signals from speed control units 1a, 1b and 1c through input/output port 31 into RAM 32. Exit from block 40 is to decision block 41 which identifies the flag now stored into RAM 32. If flag A is stored, exit is to operations block 42 which directs the sampling, or reading of each of the stored angular position signals at a high rate and if flag B or C is stored, exit is to operations block 43 which directs the reading of the stored angular position signals at a low rate.

Exit then is to operations block 44 which directs the conversion of the sampled angular position signals to quadratic position signals. Control now proceeds to operations block 45 which directs the forming of a data set by a set of quadratic position signals Xi, Yi, Zi, the mode flag stored in RAM 32 and a time-keeping signal indicating the sample-point time Ti and directs the writing of the data set into RAM 32. Exit then is to decision block 46 which tests for the presence of an end-of-teaching signal. If there is none, exit is to block 40 to repeat the process until the end-of-teaching signal occurs.

A playback mode initiates with operations block 47 in response to a command signal from mode selector 22. Block 47 directs the sequential reading of the data sets stored in RAM 32. Exit from block 47 is to decision block 48 which identifies the mode flag of the read data set. If flag A is encountered, exit is to operations block 51 which directs the conversion of the quadratic signals of the data sets into angular position signals $\theta a$, $\theta b$ and $\theta c$, which are delivered to input/output port 31 in operations block 52. If flag B is detected, exit from decision block 48 is to operations block 49 which directs the interpolation of a quadratic position using a plurality of successive quadratic positions and the generation of a set of interpolated quadratic signals Xi, Yi, Zi (i=1, 2, 3 ... n) representing the interpolated quadratic position over a segment between successive quadratic sample points. If flag C is present, exit is to operations block 50 which directs the approximation of a quadratic position using a plurality of adjacent quadratic positions and directs the generation of a set of quadratic signals representing the approximated quadratic position. Exit from operations block 49 and 50 is to block 51 to provide conversion of quadratic to polar coordinates. Decision block 53 is executed following the execution of block 52 to repeat the above process until an end-of-playback signal is generated.

Figure 5B:
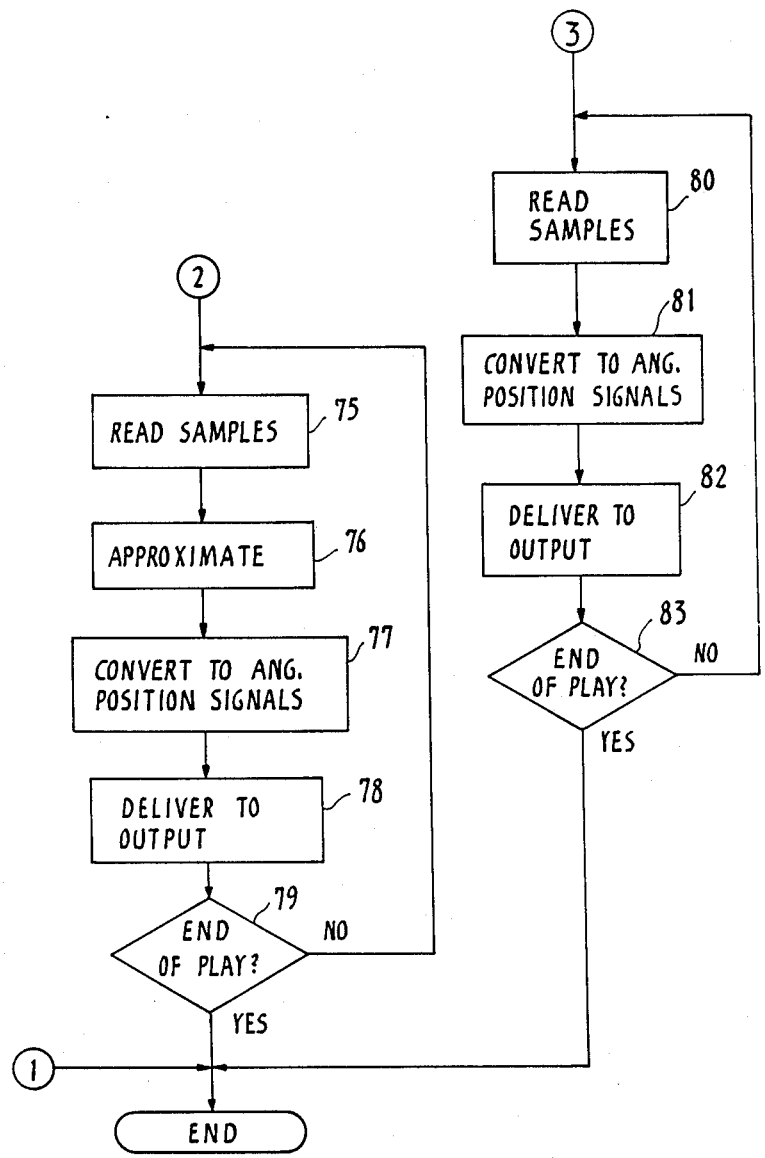
FIGS. 5A and 5B are flowcharts describing the instructions performed by the microprocessor according to another embodiment of the invention.
Figure 5A:
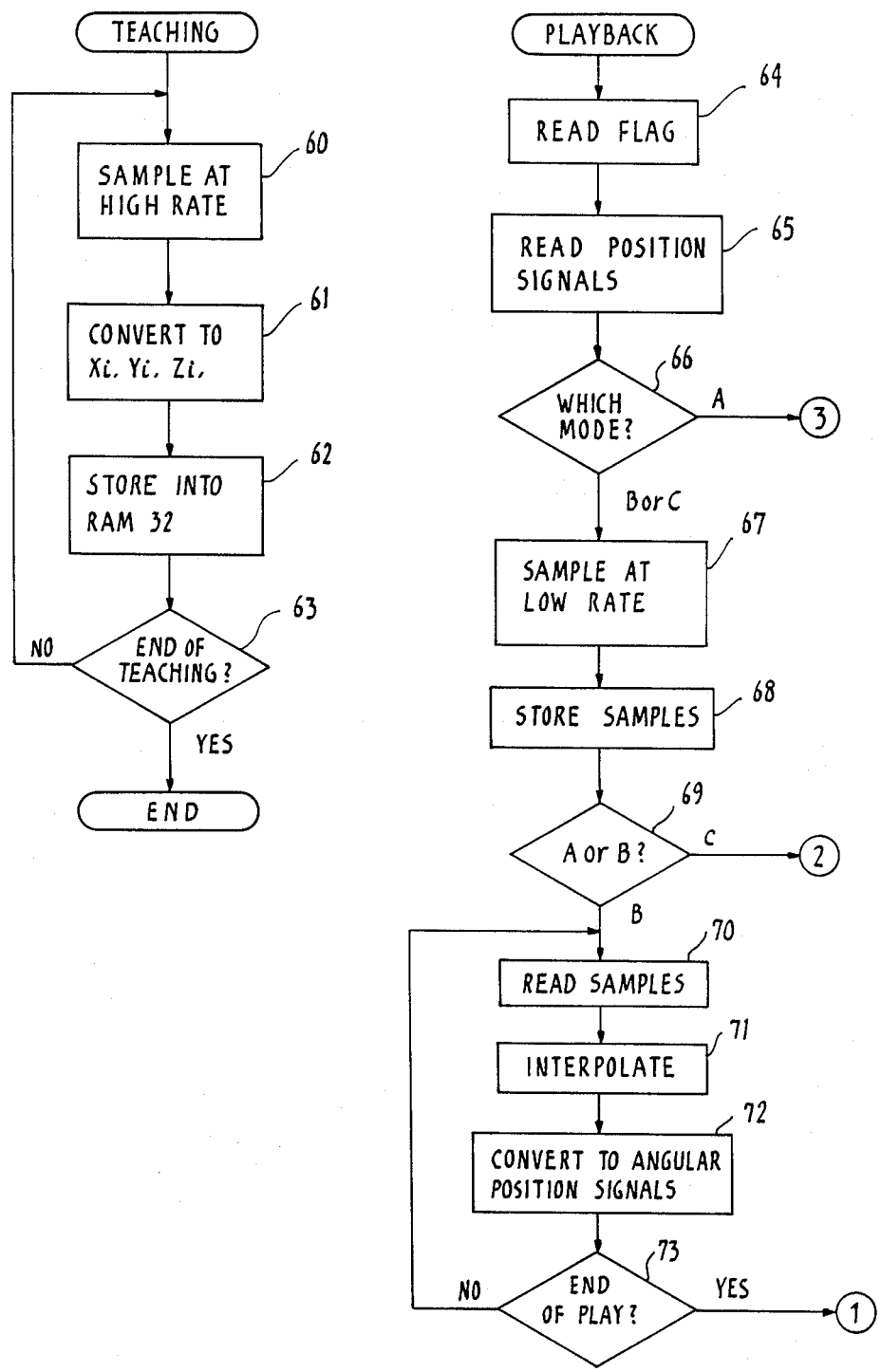

FIGS. 5A and 5B are an illustration of a modification of the program. The teaching mode starts with operations block 60 which directs the sampling of the angular position signals at a high rate and storing the samples into RAM 32. The sampled angular position signals are converted to X, Y, Z quadratic coordinate signals (block 61) and stored again into RAM 32. The process is repeated until the end-of-teaching signal is detected (block 63).

A playback mode begins with operations block 64 which directs the reading of a flag from the mode selector 22. Exit then is to operations block 65 which directs the reading of the quadratic signals from RAM 32. Decision block 66 tests for the flag just read in block 64. If flag B or C has been read, operations block 67 is executed by sampling the quadratic signals at a low rate, the sampled quadratic signals being stored into RAM 32 (block 68). Exit then is decision block 69 which tests to if the flag is B or C. If flag=A is present, control proceeds to operations block 70 which directs the reading of the quadratic signals stored in block 68 and control advances to operations block 71 which directs the determination of an intermediate value by interpolation. The quadratic signals including the interpolated signal are then converted to an angular position signals (block 72) and delivered to the input/output port (block 73). Blocks 70 to 73 are repeated until an end-of-playback signal is detected (block 74).

If flag=C is detected in block 69, exit is to operations block 75 which performs the same operations as in block 70. Control proceeds to operations block 76 which directs the determination of intermediate values by approximation. The approximated values are then converted to angular position signals (block 77) and delivered to the input/output port (block 78). Blocks 75 to 78 are repeated until an end-of-playback signal is detected (block 79).

If flag=A is detected in block 66, exit is to operations block 80 which directs the reading of the quadratic position signals from RAM 32. Control proceeds to operations block 81 which directs the conversion of the quadratic signals into corresponding angular position signals which are delivered to the input/output port (block 82). Blocks 80 to 82 are repeated until the end-of-playback signal is detected (block 83).

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A method for operating an industrial robot having an arm driven by a motor, comprising:
   (a) selectively generating first, second and third flags respectively indicating first, second and third teaching modes;
   (b) generating a signal representative of the path to be traced by said arm;
   (c) sampling said path representative signal at a higher sampling rare in response to said first flag to produce a first train of samples and sampling said path representative signal at a lower sampling rate in response to either of said second and third flags to produce a second train of samples;
   (d) interpolating a sample between successive samples of said second train in the presence of said second flag and combining the interpolated sample with the samples of said second train to derive a third train of samples and approximating samples from successive samples of said second train in the presence of said third flag to dereive a fourth train of samples; and
   (e) controlling said motor in response to said first, third and fourth trains of samples.

2. A method for operating an industrial robot having an arm driven by a motor, comprising:
   (a) selectively generating first, second and third flags;
   (b) generating an angular position signal representing the angular position of said arm in a polar coordinate system;
   (c) translating said angular position signal to a quadratic position signal represented by a quadratic coordinate system;
   (d) sampling said quadratic position signal at a higher sampling rate in response to said first flag to produce a first train of samples and sampling said quadratic position signal at a lower sampling rate in response to said second and third flags to produce a second train of samples;
   (e) interpolating a sample between successive samples of the second train in the presence of said second flag and combining the interpolated sample with the samples of the second train to derive a third train of samples, and approximating samples from successive samples of said second train in the presence of said third flag to derive a fourth train of samples;
   (f) translating the samples of said first, third and fourth trains into samples represented by said polar coordinate system; and
   (g) controlling said motor in response to the samples translated by the step (f).

3. A method for operating an industrial robot having an arm driven by a motor using a memory storing a position signal representative of the path to be traced by said arm, comprising:
   (a) selectively generating first, second and third flags;
   (b) reading said signal out of said memory at a higher rate in response to said first flag to produce a first train of samples occurring at smaller intervals and reading said signal out of said memory at a lower rate in response to said second and third flags to produce a second train of samples occurring at longer intervals;
   (c) interpolating a sample between successive samples of said second train in the presence of said second flag and combining the interpolated sample with the samples of the second train to derive a third train of samples, and approximating samples from successive samples of said second train in the presence of said third flag to derive a fourth train of samples; and
   (d) controlling said motor in response to said first, third and fourth trains of samples.

4. A method for operating an industrial robot having an arm driven by a motor using a memory storing a quadratic position signal representing the position of said arm in a quadratic coordinate system, comprising:
   (a) selectively generating first, second and third flags;
   (b) reading said signal out of said memory at a higher rate in response to said first flag to produce a first train of samples and reading said signal out of said memory at a lower rate in response to said second and third flags to produce a second train of samples;
   (c) interpolating a sample between successive samples of said second train in the presence of said second flag and combining the interpolated sample with the samples of said second train to derive a third train of samples, and approximating samples from successive samples of said second train in the presence of said third flag to derive a fourth train of samples; and
   (d) translating the samples of said first, third and fourth trains into samples representative of the angular position of said arm in a polar coordinate system; and
   (e) controlling said motor in response to the samples translated by the step (d).

5. An industrial robot having an arm driven by a motor, comprising:
   manually operated mode entry means for selecting one of first, second and third teaching modes;
   means for generating a signal representative of the path to be traced by said arm;
   means for sampling said path representative signal at a higher sampling rate when said first teaching mode is selected to produce a first train of samples and sampling said path representative signal at a lower sampling rate when said second and third teaching modes are selected to produce a second train of samples;
   means for interpolating a sample between successive samples of said second train during said second teaching mode and combining the interpolated sample with the samples of said second train to derive a third train of samples, and approximating samples from successive samples of said second train during said third teaching mode; and
   means for controlling said motor in response to said first, third and fourth trains of samples.

6. An industrial robot as claimed in claim 5, wherein said entry means includes means for generating first, second and third flags corresponding respective to said first, second and third teaching modes, further comprising:
   means for forming said first flag and said first train samples into a first data set, forming said second flag and said second train samples into a second data set and forming said third flag and said second train samples into a third data set;
   a memory for storing said first, second and third data sets; and
   means for addressing the stored data sets in said memory and decoding the flags of the addressed data sets and selectively causing said interpolating and approximating means to perform interpolation and approximation, respectively, on the samples contained in the addressed data sets in accordance with the decoded flags.

7. An industrial robot as claimed in claim 5, wherein said position signal genernating means comprises a memory storing a quadratic position signal representative of the position of said arm in a quadratic coordinate system, and wherein said sampling means comprises means for reading said stored signal to generate said first and second trains of samples.

8. An industrial robot having an arm driven by a plurality of motors about X, Y and Z axes, comprising:
   manually operated mode entry means for selecting one of first, second and third teaching modes;
   a plurality of position encoder means associated respectively with said motors for generating X, Y and Z angular position signals respectively representative of the angular positions of said arm about said X, Y and Z axes in a three-dimensional polar coordinate system;
   polar-to-quadratic coordinate translating means for translating said X, Y and Z angular position signals respectively into X, Y and Z quadratic position signals in a three-dimensional quadratic coordinate system;
   means for sampling said X, Y and Z quadratic position signals at a higher rate when said first teaching mole is selected to produce a first train of samples for each of the X, Y and Z axes of said quadratic coordinate system and sampling said X, Y and Z quadratic position signals at a lower rate when said second and third teaching modes are selected to produce a second train of samples for each of the quadratic coordinates;
   means for interpolating a sample between successive samples of said second train during said second teaching mode and combining the interpolated sample with the samples of said second train to derive a third train of samples, and approximating samples from successive samples of said second train during said third treaching mode to derive a fourth train of samples;
   quadratic-to-polar coordinate translating means for translating the first, third and fourth trains of samples into trains of samples represented by said polar coordinate system; and
   means for controlling said motor in repsonse to the output of said quadratic-to-polar coordinate translating means.

9. An industrial robot as claimed in claim 8, wherein said entry means includes menas for generating first, second and third flags corresponding respectively to said first, second and third teaching modes, further comprising:
   means for forming said first flag and said first train samples into a first data set, forming said second flag and said second train samples into a second data set and forming said third flag and said second train samples into a third data set;
   a memory for storing therein said first, second and third data sets; and
   means for addressing the stored data sets in said memory and decoding the flags of the addressed data sets and selectively causing said interpolating and approximating means to perform interpolation and approximation, respectively, on the samples contained in the addressed data sets in accordance with the decoded flags.

* * * * *